Jan. 30, 1962 H. KÖHLER 3,018,674
PORTABLE DRILL
Filed Dec. 19, 1960
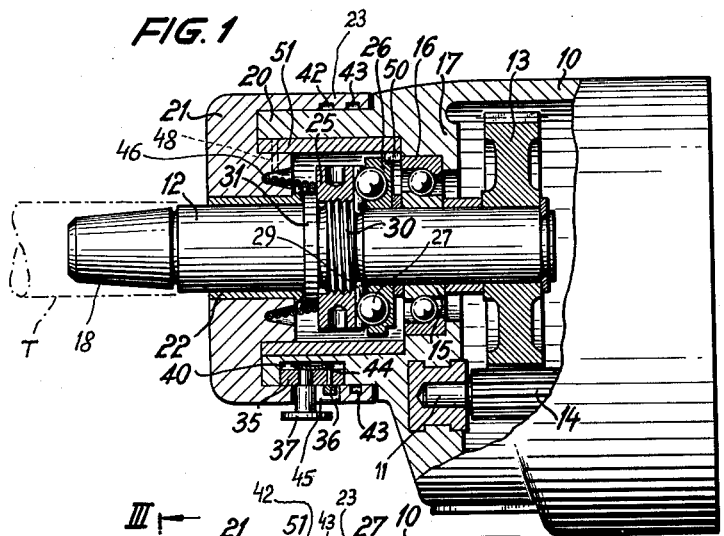
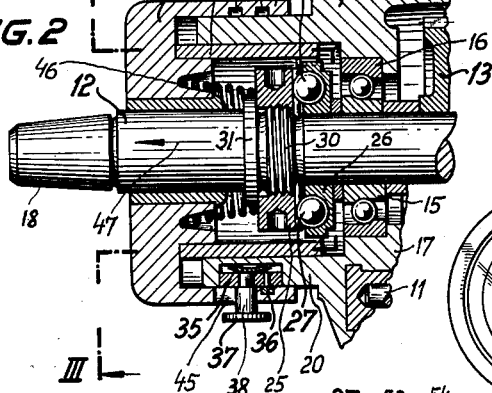
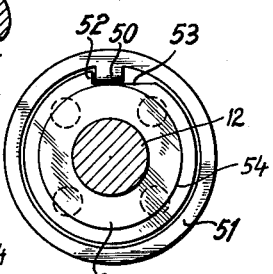
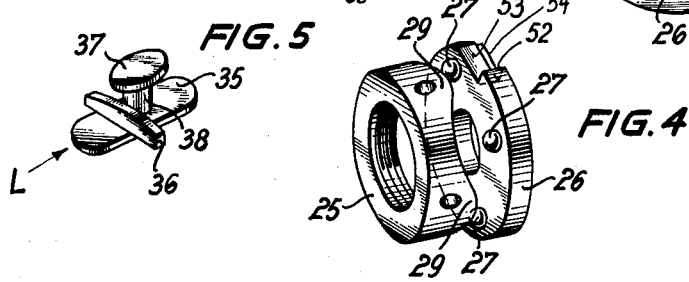
INVENTOR:
HEINRICH KÖHLER
BY
Michael S. Striker
his ATTORNEY United States Patent Office 3,018,674
Patented Jan. 30, 1962

3,018,674
PORTABLE DRILL
Heinrich Köhler, Stuttgart-Degerloch, Germany, assignor to Robert Bosch G.m.b.H., Stuttgart, Germany
Filed Dec. 19, 1960, Ser. No. 76,553
Claims priority, application Germany Dec. 24, 1959
8 Claims. (Cl. 77—32.3)

The present invention relates to drilling machines in general, and more particularly to a portable power-driven drill. Still more particularly, the invention relates to improvements in a portable electric drill which is capable of imparting axial impulses to the drilling tool.

It is already known to provide a portable drill with an arrangement which imparts axial impulses to the drilling tool. Such axial impulses improve the drilling action, particularly in brick walls and the like. However, conventional portable drills of this general character are not satisfactory when used for the formation of bores in metallic material because the drilling tool, i.e. a bit, is caught in the chips immediately before it penetrates all the way through the metallic material and is likely to break. Furthermore, the operator may sustain an injury because the machine is rapidly arrested when the tip of the bit penetrates through a completed bore.

An important object of the present invention is to provide an improved portable drill which eliminates the above enumerated drawbacks and deficiencies of conventional drills.

Another object of the invention is to porvide a portable electric drill which may be operated in conventional manner without imparting axial impulses to the drilling tool, and which may be readily adjusted to bring about such axial impulses.

A further object of the invention is to provide a portable drill of the above outlined characteristics which is constructed and assembled in such a way that the means which produces axial impulses is rendered inoperative in a fully automatic way when the drill is used in conventional manner.

A concomitant object of the invention is to provide a portable drill wherein the tool-supporting rotary spindle cannot strike against stationary parts when it transmits axial impulses to the drilling tool.

Still another object of the invention is to provide a portable drill of the above outlined characteristics wherein the arrangement which imparts axial impulses to the drilling tool is of very compact design and comprises a very small number of parts so that it may be accommodated in a comparatively small housing such as can be conveniently handled by the operator when the drill is in actual use.

An additional object of my invention is to porvide a portable drill of the above described type which may be very rapidly adjusted for operation with or without transmission of axial impulses to the drilling tool.

With the above objects in view, the invention resides in the provision of a portable motor-driven drill comprising a motor-driven spindle which is rotatably and axially movably mounted in a housing, a striking arrangement for imparting reciprocatory axial movements to the spindle, releasable locking means for restricting the axial movements of the spindle, and means for setting the striking arrangement in operative position when the spindle is free to perform axial movements with respect to its housing. In accordance with an important feature of my invention, the drill embodies means for automatically disconnecting the striking arrangement when the spindle is not free to perform an axial movement of such length as is necessary for operation of the striking arrangement and for automatically returning the striking arrangement to operative position when the locking means releases the spindle so that the latter is free to perform simultaneous rotary and axial movements.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing, in which:

FIG. 1 is a fragmentary partly elevational and partly sectional view of a portable electric drill embodying my invention, showing the striking arrangement in idle position;

FIG. 2 is a fragmentary sectional view of the drill, showing the striking arrangement in operative position;

FIG. 3 is a fragmentary section taken along the line III—III of FIG. 2, as seen in the driection of the arrows;

FIG. 4 is a perspective view of a face cam assembly constituting the striking arrangement of the drill; and FIG. 5 is a perspective view of a locking device.

Referring now in greater detail to the drawing, and first to FIG. 1, there is shown a portable electric drill which comprises a housing 10 for an electric motor (not shown) and for a step-down transmission which connects the motor shaft with a spindle 12, the transmission including a countershaft 11 which is driven by the motor shaft and is journalled in the housing 10, a pinion 14 on the countershaft, and a larger spur gear 13 which is coaxially secured to the spindle 12. It will be noted that the axial length of the pinion 14 exceeds the axial length of the spur gear 13 so that they remain in mesh even if the spindle 12 is axially shifted in the housing 10.

The spindle 12 is rotatable in a detachable ball journal bearing 15, 16 whose inner race 15 has a sliding fit on the spindle and whose outer race 16 is press-fitted into the front end wall 17 of the housing 10. The end wall 17 is integral with a forwardly projecting tubular extension 20 which is slidably received in the rearwardly extending annular flange 23 of a bearing member or cap 21 whose coaxial bore is lined with a bronze bushing 22. This bushing rotatably receives an intermediate portion of the spindle 12, and the spindle projects beyond the front end face of the cap 21 to form a conical stump 18 serving as a support for a tool T, e.g. a drill bit. The cap 21 forms the end closure of the housing 10.

The striking arrangement consists of a face cam assembly comprising two components 25, 26 which are shown in greater detail in FIG. 4. The component 26 assumes the shape of a discoid cam which is rotatably mounted on the spindle 12 and which houses four spherical elements or balls 27 in such a way that a portion of each ball projects beyond its front end face. These balls 27 cooperate with the second component in the form of a disk-shaped cam follower 25 whose rear end face is provided with four lobes 29 and which is non-rotatably secured to the spindle 12. Thus, when the cam 26 is held against rotation with the spindle 12, the latter is caused to perform axial reciprocatory movements because the lobes 29 travel along the balls 27 so that the follower 25 moves toward and away from the cam 26. The follower 25 is internally threaded and meshes with an externally threaded boss 30 of the spindle 12. The pitch of the threads on the boss 30 is such that the follower 25 cannot be separated from the spindle when the latter rotates. The front end face of the follower abuts against an annular collar 31 of the spindle 12.

In the position of FIG. 1, the striking arrangement is inoperative because the cam 26 is free to rotate with the spindle 12. The spindle has only limited freedom of axial movement in its bearings 15, 16 and in the bushing 22 which is just sufficient for a drilling operation in the conventional way, i.e. without imparting rapidly following axial impulses to the tool T. As shown in FIG. 1, the rear end of the bushing 22 abuts against the front end face of the collar 31, and the cap 21 assumes its rearmost position in which it abuts against the front end face of the extension 20. This cap is maintained in such position by a manually operable locking device L which is shown in greater detail in FIG. 5. The locking device comprises an elongated plate-like guide member 35 which is preferably formed with rounded corners, a transversely extending locking bar 36 which is fixed to the outer side of the guide member 35, and handgrip means in the form of a knob 37 which is connected with the outer side of the guide member 35 by a stem 38. The guide member 35 is received in an axially parallel peripheral recess 40 of the extension 20. The depth of this recess exceeds the thickness of the guide member 35 so that the recess may accommodate a dished spring 44 whose purpose is to permanently bias the guide member toward the inner side of the annular flange 23 forming part of the cap 21. The inner side of the flange 23 is formed with two axially spaced annular grooves 42, 43 each of which is adapted to receive the transversely extending locking bar 36 of the locking device L. In FIG. 1, the locking bar 36 is received in the front groove 42 to thereby retain the cap 21 in abutment with the front end face of the extension 20. It will be noted that the front groove 42 communicates with a longitudinal slot 45 which is provided in the flange 23 to accommodate with a certain longitudinal play the stem 38 of the knob 37. The spring 44 prevents unintentional withdrawal of the locking bar 36 from the front groove 42.

In the position of FIG. 2, the locking bar 36 is received in the rear groove 43 and the cap 21 is shifted with respect to the extension 20 through a distance equal to the axial spacing of the grooves 42, 43. In bringing about such axial displacement of the cap 21, the operator depresses the knob 37 to move the guide member 35 against the bias of the spring 44 which is then compressed against the bottom wall of the recess 40 so that the locking bar 36 is withdrawn from the front groove 42 and is momentarily received in the recess 40. A helical expansion spring 46 then causes the cap 21 to move in a direction away from the housing 10 until the stem 38 of the locking device L comes into abutment with the rear radial wall of the slot 45. If the operator then releases the knob 37, the locking bar 36 automatically enters the rear groove 43 and retains the cap 21 in the position of FIG. 2. The helical spring 46 operates between the front end face of the follower 25 and the main body portion or bottom of the cap 21. This helical spring maintains the follower 25 in permanent engagement with the balls 27 by subjecting the spindle 12 to an axial force acting in a direction counter to that indicated by the arrow 47. Of course, the spring 46 could be omitted since the operator normally presses the housing 10 in a direction to move the spindle in the direction of the arrow 47, and the follower 25 is then maintained in contact with the balls 27 by the reaction force of the material into which the tool T is caused to penetrate. However, it is normally preferred to equip the drill with the expansion spring 46 because this spring automatically shifts the cap 21 from the position of FIG. 1 into the position of FIG. 2 when the knob 37 of the locking device L is depressed.

In accordance with an important feature of my invention, the locking device L cooperates with an arresting device which automatically engages the cam 26 and holds the same against rotation with the spindle 12 as soon as the cap 21 assumes the position of FIG. 2. This arresting device assumes the form of a tubular member or cylinder 51 which is slidably received in the extension 20 of the housing 10 and is coaxially connected to the main body portion of the cap 21 by a series of radial bolts or screws 48 (only one shown in FIG. 1). The rear end of this cylinder is provided with an inwardly extending stop in the form of a lug 50 which is adapted to project into a peripheral cutout 53 of the cam 26 (see FIG. 3) to engage with an axially parallel shoulder 52 of this cam and to thereby hold the latter against rotation with the spindle 12. FIG. 2 shows the lug 50 in arresting position in which it extends into the peripheral cutout 53 and abuts against the shoulder 52. When the cylinder 51 is in the position of FIG. 1, the lug 50 projects into a circumferential notch 54 which is provided in the rear end face of the cam 26 so that the latter is free to rotate with the spindle 12 and cannot bring about axial displacements of the follower 25. In other words, the component 26 of the striking arrangement is releasably connectable to the cap 21 of the housing 10 to insure that the spindle 12 receives at least one axial impulse during each revolution.

The striking arrangement operates as follows:

It is assumed that the locking device L is in the position of FIG. 2 and that the spindle 12 is free to perform reciprocatory axial movements in and counter to the direction indicated by the arrow 47. When the motor is started, the gear 13 drives the spindle 12 at a predetermined speed and, since the cam 26 is now held against rotation by the lug 50 which abuts against the shoulder 52, the follower 25 is compelled to reciprocate and imparts axial impulses to the revolving spindle 12 and to the tool T. Such axial movements of the revolving spindle are of considerable assistance when the tool T is driven into a brick wall or the like. As stated before, the axial length of the pinion 14 is selected in such a way that the gear 13 remains in mesh therewith even if the spindle 12 performs its axial movements.

An important advantage of the just described electric drill is that the striking arrangement 50, 51 cannot become operative before the spindle 12 has sufficient freedom of axial movement such as is necessary when the follower 25 rotates with respect to the arrested cam 26, i.e. before the bar 36 of the locking device L is shifted into the rear groove 43 to permit axial movement of the bushing 22 away from the collar 31. Such automatic cooperation between the striking arrangement 25, 26 and the locking device L protects the gears in the housing 10 by insuring that any axial displacements of the spindle 12 can take place only after the spindle is free to perform such axial movements without striking against stationary parts of the drill.

When the spindle 12 is free to move in and counter to the direction indicated by the arrow 47, the expansion spring 46 and the reaction force of the tool T cause the follower 25 to remain in permanent contact with the balls 27. If the operator desires to render the striking arrangement 25, 26 inoperative, he arrests the motor which drives the spindle 12 and thereupon depresses the knob 37 of the locking device L against the bias of the spring 44 by simultaneously pushing the cap 21 rearwardly until the cap returns into the position of FIG. 1. When the knob 37 is released, the locking bar 36 automatically enters the front groove 42 and locks the spindle 12 against axial displacement though the spindle is still free to rotate when the electric drill is utilized in the conventional way, i.e. without imparting axial impulses to the tool T.

It will be readily understood that the cam assembly 25, 26 may comprise a larger or lesser number of balls 27 and/or lobes 29 as long as the spindle 12 is caused to perform at least one axial movement per revolution. Furthermore, the cam assembly 25, 26 constitutes but one form of a striking or impacting arrangement which may be used in my drill. Still further, the position of the components 25, 26 may be reversed so that the cam 26 is permanently connected with the spindle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A motor-driven portable drill comprising, in combination, housing means; rotary spindle means axially movably received in said housing means; a striking arrangement comprising a first component connectable with said housing means and a second component connected with said spindle means for imparting to said spindle means at least one axial impulse during each revolution thereof, one of said components comprising a cam and the other of said components comprising a follower; a bearing member axially movably receiving said spindle means and shiftable with respect to said spindle means between a first position in which the spindle means is free to perform axial movements and a second position in which the spindle means is restricted to rotary movements; manually operable locking means mounted in said housing means and comprising a locking member for selectively retaining said bearing member in each of said positions; and means for releasably connecting said first component to said housing means so that said spindle means is axially movable with respect to said housing means and with respect to said bearing member when the latter is in said second position.

2. A motor-driven portable drill comprising, in combination, housing means; rotary spindle means axially movably received in said housing means; a striking arrangement comprising a first component connectable with said housing means and a second component connected with said spindle means for imparting to said spindle means at least one axial impulse during each revolution thereof, one of said components comprising a cam and the other of said components comprising a follower; a bearing member axially movably receiving said spindle means and shiftable with respect to said spindle means between a first position in which the spindle means is free to perform axial movements and a second position in which the spindle means is restricted to rotary movements; manually operable locking means mounted in said housing means and comprising a locking member for selectively retaining said bearing member in each of said positions; and arresting means connected with said bearing member and comprising stop means for connecting said first component to said bearing member when the latter is in said second position.

3. A motor-driven portable drill comprising, in combination, housing means; rotary spindle means axially movably mounted in said housing means; means for driving said spindle means; a striking arrangement comprising a first component rotatably mounted on and a second component fixed to said spindle means, one of said components formed with at least one lobe and the other component comprising at least one ball cooperating with said lobe to impart axial movements to said second component when said first component is held against rotation with said spindle means; a bearing member axially movably mounted on said spindle means and shiftable between a first position in which said spindle means is free to perform axial movements and a second position in which it restricts said spindle means to rotary movements in said housing means; manually operable locking means mounted in said housing means for selectively retaining said bearing member in each of said positions; and arresting means connected with said bearing member and comprising stop means for holding said first component against rotation when said bearing member is in said first position and for permitting rotation of said first component when said bearing member is in said second position.

4. A motor-driven portable drill comprising, in combination, housing means; rotary spindle means axially movably mounted in said housing means; means for driving said spindle means; a striking arrangement comprising a first component rotatably mounted on and a second component fixed to said spindle means, one of said components formed with at least one lobe and the other component comprising at least one ball cooperating with said lobe to impart axial movements to said second component when said first component is held against rotation with said spindle means; a bearing member axially movably mounted on said spindle means and shiftable between a first position in which said spindle means is free to perform axial movements and a second position in which it restricts said spindle means to rotary movements in said housing means; means operating between said spindle means and said bearing member for permanently biasing said bearing member to said first position; manually operable locking means mounted in said housing means for selectively retaining said bearing member in each of said positions; and arresting means connected with said bearing member and comprising stop means for holding said first component against rotation when said bearing member is in said first position and for permitting rotation of said first component when said bearing member is in said second position.

5. A motor-driven portable drill comprising, in combination, housing means; rotary spindle means axially movably mounted in said housing means; means for driving said spindle means; a striking arrangement comprising a first component rotatably mounted on and a second component fixed to said spindle means, one of said components formed with at least one lobe and the other component comprising at least one ball cooperating with said lobe to impart axial movements to said second component when said first component is held against rotation with said spindle means; a bearing member axially movably mounted on said spindle means and shiftable between a first position in which said spindle means is free to perform axial movements and a second position in which it restricts said spindle means to rotary movements in said housing means; manually operable locking means mounted in said housing means for selectively retaining said bearing member in each of said positions; and arresting means connected with said bearing member and comprising stop means extending into a cutout formed in said first component for holding the latter against rotation when said bearing member is in said first position and located externally of said cutout for permitting rotation of said first component when said bearing member is in said second position.

6. A motor-driven portable drill comprising, in combination, housing means; rotary tool-supporting spindle means axially movably mounted in said housing means; means for driving said spindle means; a striking arrangement comprising a first component rotatably mounted on and a second component fixed to said spindle means, one of said components formed with at least one lobe and the other component comprising at least one ball cooperating with said lobe to impart axial movements to said second component when said first component is held against rotation with said spindle means; a bearing member axially movably mounted on said spindle means and formed with first and second groove means, said bearing member shiftable between a first position in which said spindle means is free to perform axial movements and a second position in which it restricts said spindle means to rotary movements in said housing means; manually operable spring-biased locking means mounted in said housing means and comprising a locking member respectively receivable in said first and second groove means for selectively retaining said bearing member in said first and second position; and arresting means connected with said bearing member and comprising stop means for holding said first component against rotation when said bearing member is in said first position and for permitting rotation of said first component when said bearing member is in said second position.

7. A motor-driven portable drill comprising, in combination, housing means comprising a cylindrical extension; rotary spindle means axially movably mounted in said housing means; means for driving said spindle means; a striking arrangement comprising a first component rotatably mounted on and a second component fixed to said spindle means, one of said components formed with at least one lobe and the other component comprising at least one ball cooperating with said lobe to impart axial movements to said second component when said first component is held against rotation with said spindle means; a bearing member axially movably mounted on said spindle means and shiftable about said extension between a first position in which said spindle means is free to perform axial movements and a second position in which it restricts said spindle means to rotary movements in said housing means; manually operable locking means mounted in said extension for selectively retaining said bearing member in each of said positions; and arresting means including a cylinder connected with said bearing member and slidably received in said extension, said cylinder comprising stop means for holding said first component against rotation when said bearing member is in said first position and for permitting rotation of said first component when said bearing member is in said second position.

8. A portable electric drill comprising, in combination, housing means; rotary spindle means axially movably received in said housing means; a striking arrangement comprising a first component connectable with said housing means and a second component connected with said spindle means and cooperating with said first component for imparting to said spindle means at least one axial impulse during each revolution thereof when said first component is connected with said housing means, one of said components comprising a cam and the other of said components comprising a follower; a bearing member axially movably receiving said spindle means and mounted on said housing means, said bearing member shiftable with respect to said housing means between a first position in which the spindle means is free to perform axial movements and a second position in which the spindle means is restricted to rotary movements; manually operable locking means mounted in said housing means and comprising a locking member for selectively retaining said bearing member in each of said positions; and means for releasably connecting said first component to said housing means so that said spindle means is axially movable with respect to said housing means and with respect to said bearing member when the latter is in said second position.

References Cited in the file of this patent

FOREIGN PATENTS 552,691     Italy ------------------ Dec. 10, 1956